(No Model.)
R. R. PACE.
AUTOMATIC VEHICLE BRAKE.
No. 289,698. Patented Dec. 4, 1883.
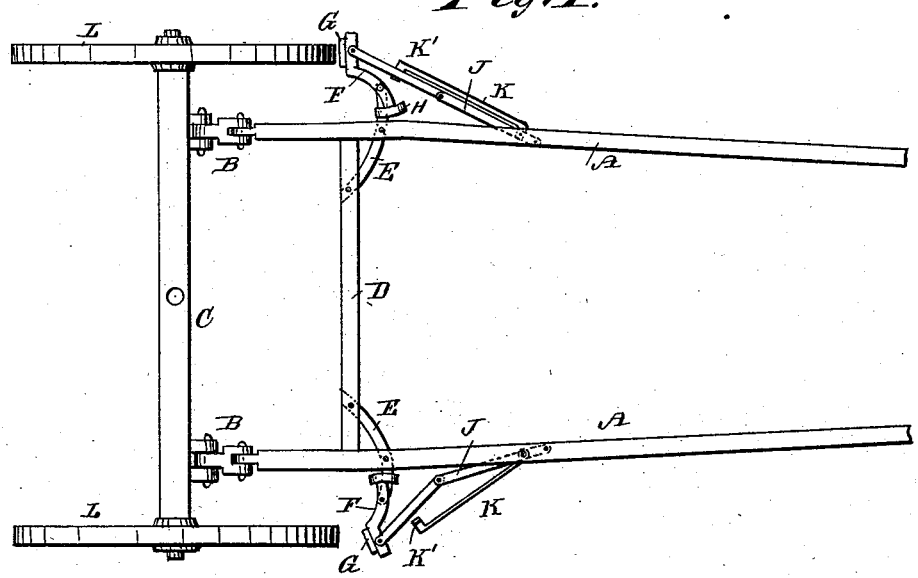
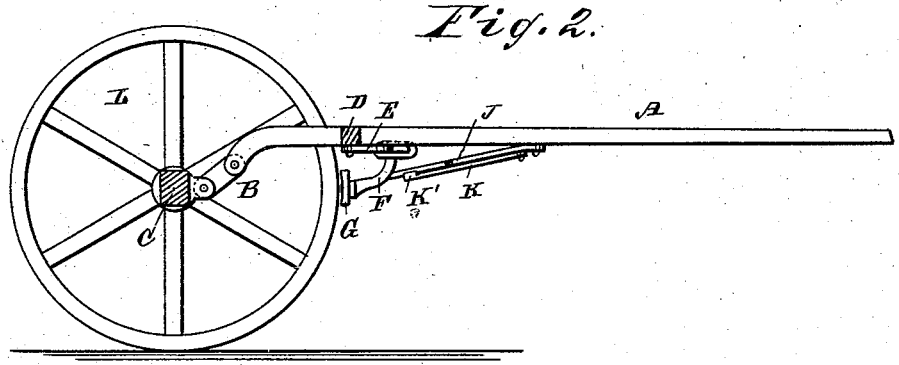
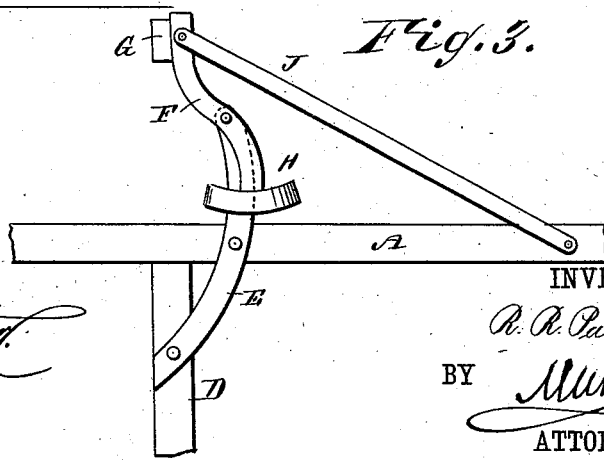
WITNESSES:
Theo. G. Hoster
C. Sedgwick
INVENTOR:
R. R. Pace
BY Munn & Co
ATTORNEYS.

UNITED STATES PATENT OFFICE.

RICHARD R. PACE, OF LINEVILLE, ALABAMA.

AUTOMATIC VEHICLE-BRAKE.

SPECIFICATION forming part of Letters Patent No. 289,698, dated December 4, 1883.

Application filed September 22, 1883. (No model.)

*To all whom it may concern:*

Be it known that I, RICHARD R. PACE, of Lineville, in the county of Clay and State of Alabama, have invented a new and Improved Automatic Brake for Vehicles, of which the following is a full, clear, and exact description.

The object of my invention is to provide a new and improved brake for vehicles, which brake is applied automatically, and can be locked to be inoperative in case the vehicle is to be backed, &c.

The invention consists in levers pivoted on thills held to the front axle by shackles, which levers carry brake-shoes at the outer ends, and have the outer ends connected with the thills by extensible braces.

The invention also consists in various parts and details, as will be fully described and set forth hereinafter.

Reference is to be had to the accompanying drawings, forming part of this specification, in which similar letters of reference indicate corresponding parts in all the figures.

Figure 1 is a plan view of the front of a vehicle provided with my improved vehicle-brake. Fig. 2 is a side view of the same, parts being shown in section. Fig. 3 is an enlarged plan view of a modification of the same.

The thills A are hinged by means of shackles B to the front axle, C, and are united by a cross-bar, D. Arms E, secured to the thills and to the cross-bar D, project from the sides of the thills, and to the outer end of each arm E a curved lever, F, is pivoted, which has a brake-shoe, G, secured to the outer end. A flattened guide-loop, H, is secured to the inner end of each curved lever F, which loops surround the arms E. A brace, J, extends from the free end of each lever F to the corresponding thill. If desired, the brace J can be jointed, in which case a locking-lever, K, is pivoted to the bottom of the thill at about the same point at which the forward end of the brace is pivoted, or to the brace, the said locking-levers being each provided at the inner free ends with a hook or catch, K', for receiving the brace. If the brakes are to operate, the braces J are extended and are locked in position by the locking-lever K. If the vehicle runs downward and the horse holds back, the inner ends of the thills are swung up against the axle, and the brake-shoes are pressed against the front wheels, L, and check the vehicle. The brakes are thus applied automatically. If the brakes are not to be applied, the braces J are unlocked from the levers K, and are pressed toward the thills, whereby the braces are shortened to such an extent that the brake-shoes will be held such a distance from the wheels that they cannot be pressed against the wheels when the horse holds back.

Having thus described my invention, what I claim as new, and desire to secure by Letters Patent, is—

1. The combination, with thills held to the front axle by means of shackles, of pivoted levers carrying brake-shoes at the outer ends, and extensible braces pivoted to the outer ends of the levers and to the thills, substantially as herein shown and described.

2. The combination, with thills held to the front axle by shackles, of pivoted levers carrying brake-shoes at the outer ends, braces hinged to the outer ends of the levers and to the thills, and of levers for locking the braces in position when extended, substantially as herein shown and described.

3. The combination, with thills held to the front axle by shackles, of pivoted levers carrying brake-shoes at the outer ends, hinged braces pivoted to the outer ends of the levers and to the thills, and of locking-levers K, provided with hooks K', substantially as herein shown and described.

4. The combination, with thills held to the front axle by shackles, of the arms E, the levers F, pivoted to the outer ends of the arms, brake-shoes G, held on the outer ends of the levers, guide-loops H, held on the inner ends of the levers F, and of braces held to the outer ends of the levers F and to the thills, substantially as herein shown and described.

RICHARD R. PACE.

Witnesses:
ISAIAH F. COLE,
D. A. WOOD.